United States Patent
Day

(10) Patent No.: US 12,074,504 B2
(45) Date of Patent: Aug. 27, 2024

(54) SUPPLYING AC ELECTRICITY FROM A PHOTOVOLTAIC SYSTEM WITHOUT AN ELECTRONIC POWER INVERTER

(71) Applicant: Trane International Inc., Davidson, NC (US)

(72) Inventor: Michael Sean Day, Sacramento, CA (US)

(73) Assignee: TRAN E INTERNATIONAL INC., Davidson, NC (US)

( * ) Notice: Subject to any disclaimer, the term of this patent is extended or adjusted under 35 U.S.C. 154(b) by 0 days.

(21) Appl. No.: 18/063,416

(22) Filed: Dec. 8, 2022

(65) Prior Publication Data

US 2023/0104219 A1 Apr. 6, 2023

Related U.S. Application Data

(63) Continuation of application No. 17/443,308, filed on Jul. 23, 2021.

(51) Int. Cl.
*H02K 7/18* (2006.01)
*F03B 13/06* (2006.01)

(52) U.S. Cl.
CPC ........... *H02K 7/1823* (2013.01); *F03B 13/06* (2013.01)

(58) Field of Classification Search
CPC .............................. H02K 7/1823; F03B 13/06
USPC ....................................................... 290/43, 54
See application file for complete search history.

(56) References Cited

U.S. PATENT DOCUMENTS

| | | | |
|---|---|---|---|
| 4,132,901 A * | 1/1979 | Crausbay | E02B 9/00 417/330 |
| 4,272,685 A | 6/1981 | Toyama | |
| 5,420,463 A * | 5/1995 | Agostino | F03B 17/005 290/53 |
| 6,445,078 B1 | 9/2002 | Cieslak, Jr. | |
| 7,866,919 B2 | 1/2011 | Miller | |
| 7,956,485 B1 | 6/2011 | Simnacher | |

(Continued)

FOREIGN PATENT DOCUMENTS

| | | |
|---|---|---|
| DE | 43 01 659 A1 | 7/1994 |
| EP | 1 925 817 B1 | 10/2012 |

OTHER PUBLICATIONS

Super Handy, Electric Shredder & Mulcher Operator's Manual, Nov. 26, 2020, pp. E1, E8 (Year: 2020).*

(Continued)

*Primary Examiner* — Charles Reid, Jr.
(74) *Attorney, Agent, or Firm* — Womble Bond Dickinson (US) LLP

(57) ABSTRACT

A method is provided for supplying alternating current (AC) electricity. The method includes receiving direct current (DC) electricity from a source of electric power at a motorized pump, and converting the DC electricity from the source of electric power to AC electricity. This includes converting the DC electricity to first motive power at the motorized pump to move water from a source location to at least one supply location. The water is supplied from the at least one supply location to a turbine, and kinetic energy of the water is converted to second motive power at the turbine. The second motive power is converted to the AC electricity at an electric generator that is connected to the turbine, and the AC electricity is supplied from the electric generator.

20 Claims, 4 Drawing Sheets

(56) References Cited

U.S. PATENT DOCUMENTS

| | | | | |
|---|---|---|---|---|
| 8,008,796 | B2* | 8/2011 | Muchow | E03B 11/12 290/43 |
| 8,643,206 | B2 | 2/2014 | Ekern | |
| 2005/0034452 | A1 | 2/2005 | Davis | |
| 2009/0160192 | A1 | 6/2009 | Chen | |
| 2012/0299304 | A1 | 11/2012 | Al-Saffar | |

OTHER PUBLICATIONS

Hydraulic-solar power plant in northern Chile receives environmental permit. la Segunda online, Economia, Reuters, Dec. 4, 2015, 2 pages.

Innovative Operation of Pumped Hydropower Storage. Innovation Landscape Brief, IRENA (International Renewable Energy Agency), Abu Dhabi, 2020. 24 pages.

World's first integrated solar pumped hydro project. Utility journalist, Energy Magazine, Feb. 19, 2018. 6 pages. Retrieved from the Internet <URL: https://www.energymagazine.com.au/worlds-first-integrated-solar-pumped-hydro-project/>.

* cited by examiner

316 — RETURN THE WATER FROM THE TURBINE BACK TO THE SOURCE RESERVOIR AS THE KINETIC ENERGY OF THE WATER IS CONVERTED TO THE SECOND MOTIVE POWER

318 — SUPPLY THE WATER FROM EITHER OR BOTH THE COUPLING OR THE SUPPLY RESERVOIR

320 — PRODUCE THE SECOND MOTIVE POWER FROM THE KINETIC ENERGY OF THE WATER, AND FROM INERTIA IN THE TURBINE

FIG. 3D

SUPPLYING AC ELECTRICITY FROM A PHOTOVOLTAIC SYSTEM WITHOUT AN ELECTRONIC POWER INVERTER

RELATED APPLICATION

This application is a continuation of U.S. patent application Ser. No. 17/443,308 filed Jul. 23, 2021.

TECHNOLOGICAL FIELD

The present disclosure relates generally to electricity generation, and in particular, converting direct current (DC) electricity to alternating current (AC) electricity without an electronic power inverter.

BACKGROUND

The demand for renewable energy has grown for a number of years, and photovoltaics (PV) in which light is converted to electricity is one prevalent renewable energy source. Most if not all PV systems convert light into direct current (DC) electricity, and use conventional electronic power inverters to convert the DC electricity to alternating current (AC) electricity that is used in many buildings and other load facilities. These electronic power inverters, however, are subject to certain issues that limit their value.

The AC electricity produced by many electronic power inverters includes a waveform that is synthetically produced by rapid switching. The AC electricity therefore inherently suffers from some degree of total harmonic distortion, which degrades the power quality of the electrical energy produced. The lack of any inertia in an electronic power inverter also leads to additional power quality issues that often necessitate difficult and expensive mitigation when connecting to a power grid. Due to having switching components only weighing a gram or less, electronic synthetic waveform producing components are also much more susceptible to thermal damage from transients such as natural or man-made electromagnetic weather.

It would therefore be desirable to have a system and method that takes into account at least some of the issues discussed above, as well as other possible issues.

BRIEF SUMMARY

Example implementations provide an improved system and method of supplying alternating current (AC) electricity in which direct current (DC) electricity from a source of electric power such as a photovoltaic (PV) system is converted to AC electricity without an electronic power inverter. Example implementations instead use hydraulically-coupled motor generation, which provides a number of benefits over current electronic power inverter-based systems. In particular, for example, as example implementations of the present disclosure are based on an analog generation technology, the AC electricity may have a cleaner waveform in terms of total harmonic distortion.

Example implementations may employ a generator to generate the AC electricity from a water-driven turbine. The generator may have inertia that enables an inherent ride through capability that an electronic power inverter does not possess. This may be of greater benefit to a power system from a power quality standpoint than a system in which an electronic power inverter without inertia is used. Conversely, the system of example implementations with inertia and analog output has fewer negative impacts on the power grid power, which may also lead to fewer and less expensive network upgrades. This reduction in interconnection cost, complexity, and time may be of substantial benefit to project developers. Additionally, when seeking a utility off-taker for power, the system of example implementations may be easier for one to market its high power quality output, which may provide a competitive advantage over systems that use a conventional electronic power inverter.

Example implementations of the present disclosure also lends itself to incorporation of lower-cost energy storage in the form of hydraulic storage at altitude, such as a water tank on a hill or another elevation. Unlike traditional energy storage such as lithium ion batteries, water storage tanks and water supply networks that provide this energy storage attribute may be discharge insensitive in that they can be charged and discharged multiple times per day for decades with no loss of capability. This storage may also allow the system of example implementations to operate in a multiple-use configuration in which the same storage tanks used for the energy generation may also be used for other purposes such as a municipal water supply, or as a water supply for other purposes such as for fire protection or industrial purposes.

The present disclosure thus includes, without limitation, the following example implementations.

Some example implementations provide a system for supplying alternating current (AC) electricity, the system comprising a motorized pump configured to receive direct current (DC) electricity from a source of electric power, and convert the DC electricity to first motive power to move water from a source location to at least one supply location; a turbine configured to convert kinetic energy of the water supplied from the at least one supply location to second motive power; a water supply network is configured to carry the water as the water is moved from the source location to the at least one supply location, and supplied from the at least one supply location to the turbine; and an electric generator connected to the turbine, the electric generator configured to convert the second motive power to the AC electricity, and supply the AC electricity.

Some example implementations provide a method of supplying alternating current (AC) electricity, the method comprising receiving direct current (DC) electricity from a source of electric power at a motorized pump; converting the DC electricity from the source of electric power to AC electricity, including at least: converting the DC electricity to first motive power at the motorized pump to move water from a source location to at least one supply location; supplying the water from the at least one supply location to a turbine; converting kinetic energy of the water to second motive power at the turbine; and converting the second motive power to the AC electricity at an electric generator that is connected to the turbine; and supplying the AC electricity from the electric generator.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 3A, 3B, 3C and 3D are flowcharts illustrating various steps in a method of supplying AC electricity, according to various example implementations.

DETAILED DESCRIPTION

Figure 1:
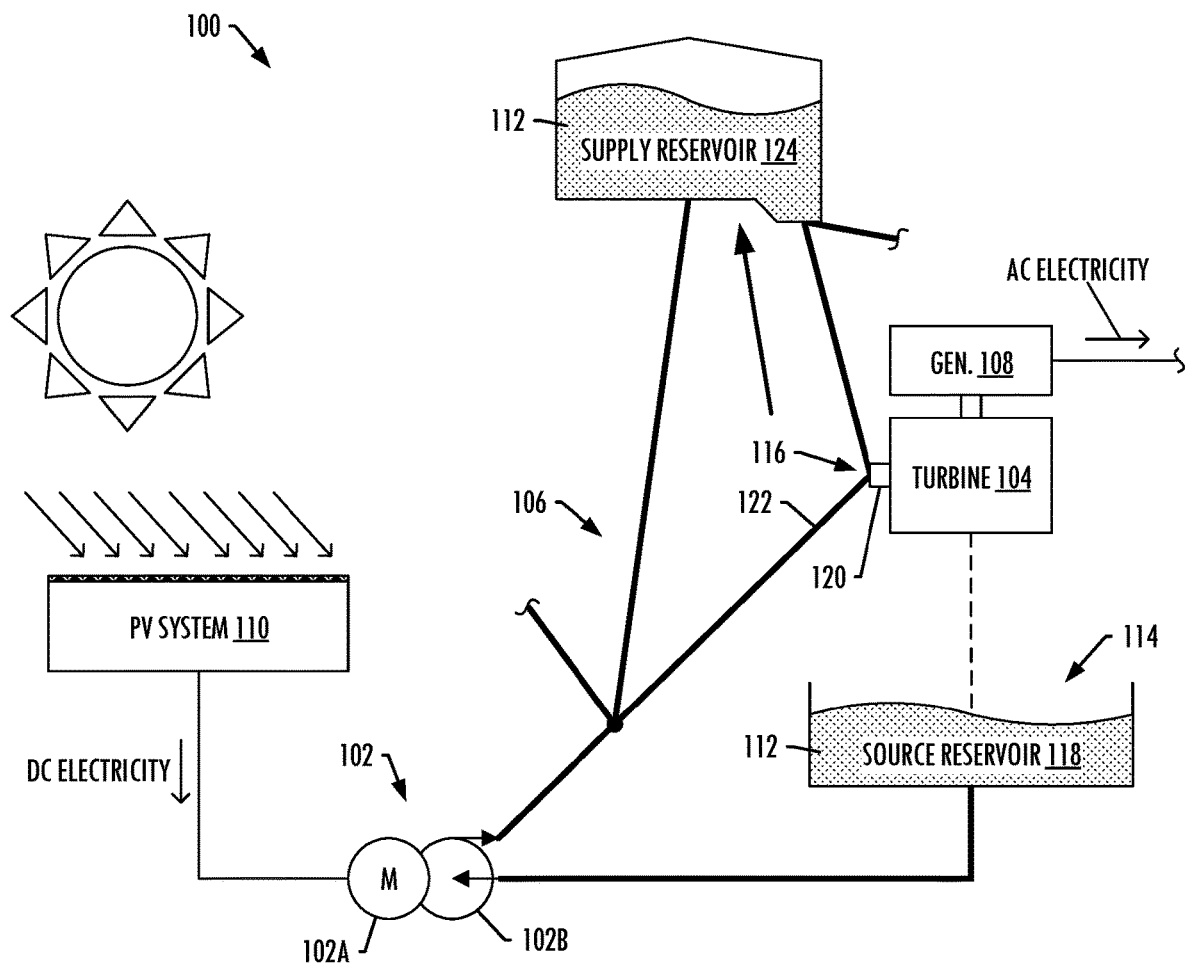
FIG. 1 illustrates a system for supplying alternating current (AC) electricity, according to various example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," "observation" and similar terms may be at times used interchangeably.

As indicated above, example implementations of the present disclosure are generally directed to electricity generation, and in particular, converting direct current (DC) electricity from a source of electric power such as a photovoltaic (PV) system to alternating current (AC) electricity. FIG. 1 illustrates a system 100 for supplying AC electricity according to some example implementations of the present disclosure. As shown, the system includes a motorized pump 102, a turbine 104 such as a water turbine, a water supply network 106, and an electric generator 108. The motorized pump is configured to receive DC electricity from a source of electric power such as a PV system 110. Other examples of suitable sources of electric power include one or more batteries, as well as other renewable power systems such as a wind power system, wind farm or the like.

The motorized pump 102 is configured to convert the DC electricity to first motive power to move water 112 from a source location 114 to at least one supply location 116. In some examples, the motorized pump includes a DC motor 102A configured to drive a pump 102B. In other examples, the motorized pump may include a variable-frequency drive with an AC induction motor that is configured to drive a pump. In yet other examples in which the system may include a front-end electronic power inverter, the motorized pump may include an electronic power inverter to convert the DC electricity to AC electricity. In these examples, an AC induction motor may convert the AC electricity to the first motive power.

The water supply network 106 is generally a network of components that carry water 112 throughout the system 100. The water supply network may include a pipe network for distribution of the water. Additionally, the water supply network may include or connect to one or more natural or artificial reservoirs of water, which in some more particular examples may include storage tanks. In this regard, some example implementations contemplate a source reservoir that may be a storage tank such as a fixed roof tank.

In particular, the water supply network 106 is configured to carry water 112 from the source location 114 to the at least one supply location 116. The water supply network is also configured to carry the water that is supplied from the at least one supply location to the turbine 104. The turbine, then, is configured to convert kinetic energy of the water supplied from the at least one supply location to second motive power. The second motive power may also be produced from any inertia in the turbine. The electric generator 108 is connected to the turbine, and configured to convert the second motive power to the AC electricity, and supply the AC electricity. The system 100 of example implementations of the present disclosure is therefore configured to convert the DC electricity produced by the source of electric power (e.g., PV system 110) to AC electricity, in various examples without an electronic power inverter or other similar power electronic device or circuitry.

In some examples, the source location 114 is at a source reservoir 118 from which the motorized pump 102 is configured to draw the water 112 that is moved to the at least one supply location 116, and supplied to the turbine 104 by the water supply network 106. In some of these examples, the turbine is further configured to return the water from the turbine back to the source reservoir as the kinetic energy of the water is converted to the second motive power. The system 100 may therefore be discharge insensitive in that they can be charged and discharged multiple times per day for decades with no loss of capability.

The at least one supply location 116 may include a coupling 120 connected to the turbine 104. In some of these examples, the motorized pump 102 is configured to move the water 112 to the coupling from which the water is supplied directly to the turbine. The water supply network 106, then, may include a penstock 122 connected to the coupling, and that controls supplies water to the turbine. The kinetic energy of the water, then, is from movement of the water through the penstock to the coupling and thereby the turbine.

Additionally or alternatively, the at least one supply location 116 may include a supply reservoir 124 located at a higher elevation than the turbine 104, and from which the water 112 may be supplied to the turbine (in some examples also by way of the coupling 120). In examples including these multiple supply locations, the turbine may be supplied the water from either or both the coupling (directly) or the supply reservoir (in which case the water may also be supplied to the turbine from the coupling). In this regard, the water may be supplied on a continuum from entirely the coupling, to some combination of the coupling and the supply reservoir, to entirely the supply reservoir. In other examples, the water may be supplied from the supply reservoir without a more direct supply of water from the motorized pump 102.

In more particular examples including multiple supply locations, an operator may control the water 112 to the turbine 104 from the motorized pump 102, the supply reservoir 124, or some combination of the supply locations. This control of the water supply may be based on a number of factors, and may vary over one or more time intervals.

In some examples, the water 112 may be supplied from either supply location to the extent the system 100 is able to produce a sufficient amount of AC electricity, and supplement with a supply of water from the other supply location to address any deficiency in the amount of AC electricity being produced. In another example, the water may be supplied from the motorized pump 102 when sufficient DC electricity is available to power the motorized pump, and from the supply reservoir 124 when the DC electricity is unavailable. This may vary by time of day for a source of electric power such as a PV system 110, or by environmental conditions for another renewable power system such as a wind power system. Similarly, the water may be supplied from the supply reservoir when sufficient water is available from the supply reservoir to drive the turbine 104, and from the motorized pump when sufficient water is unavailable from the supply reservoir.

The supply reservoir 124 may also function as an external supply reservoir for an external water supply system, or the motorized pump may be further configured to move water to an external supply location for an external water supply system. The motorized pump 102, then, may be configured to move the water 112 to the coupling 120 from which the water is supplied to the turbine, and move the water to the external supply reservoir for the external water supply system configured to supply the water independent of the AC electricity supplied by the electric generator 108. This external water supply may then use the water for other purposes such as a municipal water supply, or as a water supply for other purposes such as for fire protection or industrial purposes.

In some examples, the electric generator 108 is configured to supply the AC electricity to an electric transmission and distribution (T&D) system that includes a power grid through which the AC electricity is delivered to one or more load facilities. Additionally or alternatively, the electric generator may be configured to supply the AC electricity to a load facility independent of such an electric T&D system. In this regard, the system 100 may be considered a generation facility that is part of or independent of a T&D system through which AC electricity is delivered to load facilities, which may be the case in some examples in which the system and load facilities are part of a microgrid.

Figure 2:
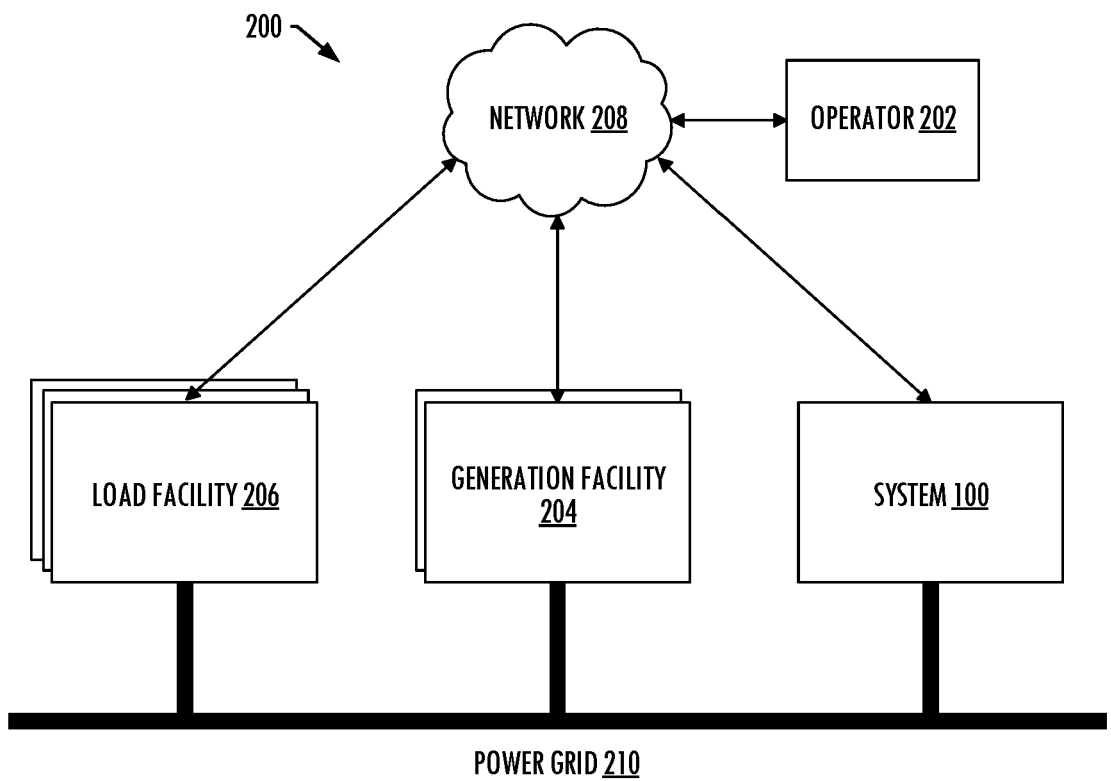
FIG. 2 illustrates an electric transmission and distribution system according to various example implementations.
Figure 3A:
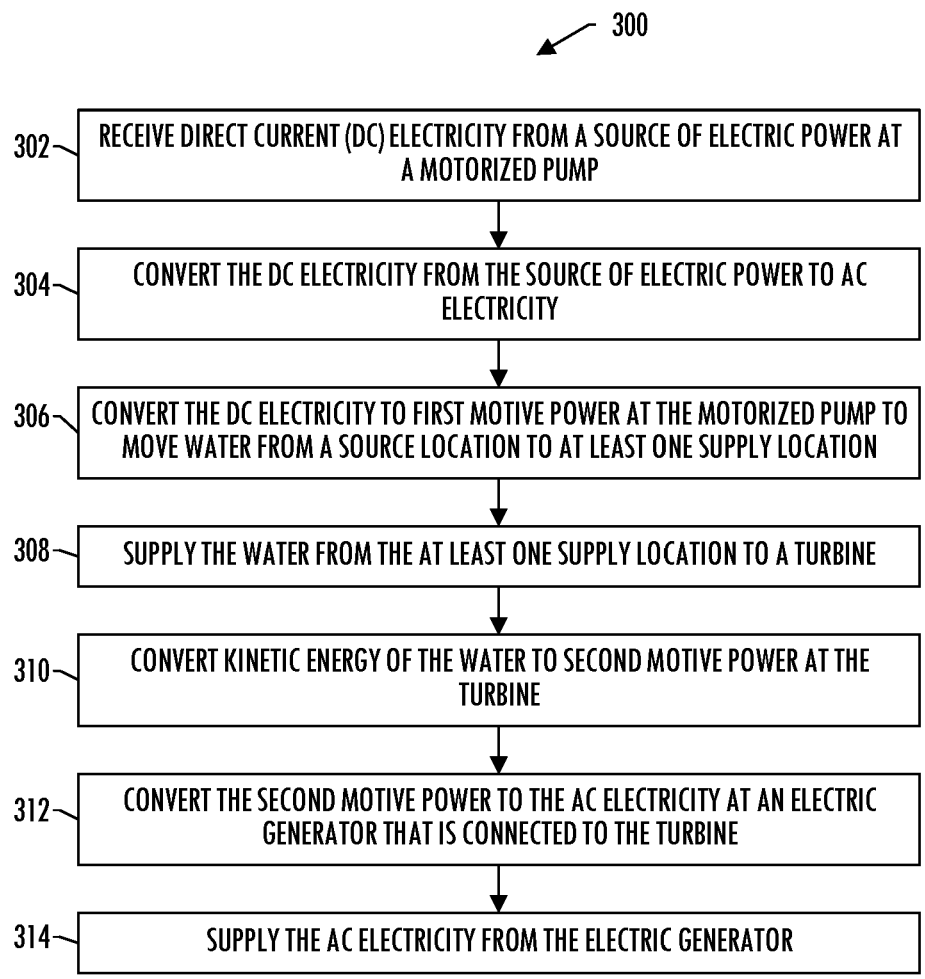

FIG. 2 illustrates an electric T&D system 200 according to various example implementations of the present disclosure. As shown, the T&D system includes at least one system operator (at times more simply referred to as an operator 202). In various examples, the operator may be an independent system operator (ISO), transmission system operator (TSO), distribution system operator (DSO) or the like. The operator is in operable communication with at least one generation facility 204 and at least one load facility 206. In some examples, the operator, load facility and/or generation facility may communicate with one another across one or more networks 208 such as one or more telecommunications networks, computer networks or the like. In this regard, the system operator, load facility and/or generation facility may be wired or wirelessly coupled to the one or more networks.

The operator 202 may be configured to coordinate, control and monitor a power grid 210 (at times referred to as a T&D grid), including the transmission and/or distribution of electric power on the power grid. The generation facility 204 is configured to contribute power into the power grid through which power is delivered to the load facilities 206. In this regard, again, the system 100 of example implementations may be configured to implement a generation facility. The load facilities are generally facilities configured to draw power from the power grid. The load facilities include any consumer of electrical power, such as industrial facilities, institutional facilities, commercial facilities, residential facilities and the like. In some examples, the load facilities include buildings such as industrial buildings, institutional buildings, commercial buildings, residential buildings and the like. Even further, examples of suitable commercial buildings include office buildings, warehouses, retail buildings and the like.

FIGS. 3A-3D are flowcharts illustrating various steps in a method 300 of supplying AC electricity, according to various example implementations of the present disclosure. The method includes receiving DC electricity from a source of electric power (e.g., a PV system) at a motorized pump, as shown at block 302 of FIG. 3A. The method includes converting the DC electricity from the source of electric power to AC electricity, as shown at block 304.

As also shown, converting the DC electricity to AC electricity includes converting the DC electricity to first motive power at the motorized pump to move water from a source location to at least one supply location, as shown at block 306. The method includes supplying the water from the at least one supply location to a turbine, as shown at block 308. The method includes converting kinetic energy of the water to second motive power at the turbine, as shown at block 310. And the method includes converting the second motive power to the AC electricity at an electric generator that is connected to the turbine, and supplying the AC electricity from the electric generator, as shown at blocks 312 and 314.

In some examples, the source location is at a source reservoir from which the motorized pump draws the water that is moved to the at least one supply location and supplied to the turbine. In some of these examples, the method 300 further includes returning the water from the turbine back to the source reservoir as the kinetic energy of the water is converted to the second motive power, as shown at block 316 of FIG. 3B.

In some examples, the at least one supply location includes a coupling connected to the turbine. In some of these examples, the motorized pump moves the water to the coupling from which the water is supplied directly to the turbine, and the kinetic energy of the water is from movement of the water to the coupling and thereby the turbine.

In some further examples, the at least one supply location further includes a supply reservoir located at a higher elevation than the turbine, and supplying the water at block 308 includes supplying the water from either or both the coupling or the supply reservoir, as shown at block 318 of FIG. 3C.

In some examples, the DC electricity is converted to the first motive power at the motorized pump at block 306 to move the water to the coupling from which the water is supplied to the turbine, and move the water to an external supply reservoir for an external water supply system that supplies the water independent of supplying the AC electricity.

In some examples, the at least one supply location includes a supply reservoir located at a higher elevation than the turbine, and gravitational potential energy of the water at the supply reservoir is converted to the kinetic energy of the water from movement of the water as the water is supplied to the turbine at block 308.

In some examples, converting the kinetic energy at block 310 includes the turbine producing the second motive power from the kinetic energy of the water, and from inertia in the turbine, as shown at block 320 of FIG. 3D.

In some examples, the AC electricity is supplied at block 314 to an electric transmission and distribution system that includes a power grid through which the AC electricity is delivered to one or more load facilities.

In some examples, the AC electricity is supplied at block 314 from the electric generator to a load facility independent of an electric transmission and distribution system that includes a power grid through which AC electricity is delivered.

In some examples, the DC electricity is converted to the first motive power at the motorized pump at block 306 to move the water to the at least one supply location, and move the water to an external supply location for an external water supply system that supplies the water independent of supplying the AC electricity.

As explained above and reiterated below, the present disclosure includes, without limitation, the following example implementations.

Clause 1. A system for supplying alternating current (AC) electricity, the system comprising: a motorized pump configured to receive direct current (DC) electricity from a source of electric power, and convert the DC electricity to first motive power to move water from a source location to at least one supply location; a turbine configured to convert kinetic energy of the water supplied from the at least one supply location to second motive power; a water supply network configured to carry the water as the water is moved from the source location to the at least one supply location, and supplied from the at least one supply location to the turbine; and an electric generator connected to the turbine, the electric generator configured to convert the second motive power to the AC electricity, and supply the AC electricity.

Clause 2. The system of clause 1, wherein the source location is at a source reservoir from which the motorized pump is configured to draw the water that is moved to the at least one supply location and supplied to the turbine by the water supply network, and wherein the turbine is further configured to return the water from the turbine back to the source reservoir as the kinetic energy of the water is converted to the second motive power.

Clause 3. The system of Clause 1 or clause 2, wherein the at least one supply location includes a coupling connected to the turbine, the motorized pump is configured to move the water to the coupling from which the water is supplied directly to the turbine, and the kinetic energy of the water is from movement of the water to the coupling and thereby the turbine.

Clause 4. The system of clause 3, wherein the at least one supply location further includes a supply reservoir located at a higher elevation than the turbine, and the turbine is supplied the water from either or both the coupling or the supply reservoir.

Clause 5. The system of clause 3 or clause 4, wherein the motorized pump is configured to convert the DC electricity to the first motive power to move the water to the coupling from which the water is supplied to the turbine, and move the water to an external supply reservoir for an external water supply system configured to supply the water independent of the AC electricity supplied by the electric generator.

Clause 6. The system of any of clauses 1 to 5, wherein the at least one supply location includes a supply reservoir located at a higher elevation than the turbine, and gravitational potential energy of the water at the supply reservoir is converted to the kinetic energy of the water from movement of the water as the water is supplied to the turbine.

Clause 7. The system of any of clauses 1 to 6, wherein the turbine configured to convert the kinetic energy includes the turbine configured to produce the second motive power from the kinetic energy of the water, and from inertia in the turbine.

Clause 8. The system of any of clauses 1 to 7, wherein the electric generator is configured to supply the AC electricity to an electric transmission and distribution system that includes a power grid through which the AC electricity is delivered to one or more load facilities.

Clause 9. The system of any of clauses 1 to 8, wherein the electric generator is configured to supply the AC electricity to a load facility independent of an electric transmission and distribution system that includes a power grid through which AC electricity is delivered.

Clause 10. The system of any of clauses 1 to 9, wherein the motorized pump is configured to convert the DC electricity to the first motive power at the motorized pump to move the water to the at least one supply location, and move the water to an external supply location for an external water supply system configured to supply the water independent of the AC electricity supplied by the electric generator.

Clause 11. A method of supplying alternating current (AC) electricity, the method comprising: receiving direct current (DC) electricity from a source of electric power at a motorized pump; converting the DC electricity from the source of electric power to AC electricity, including at least: converting the DC electricity to first motive power at the motorized pump to move water from a source location to at least one supply location; supplying the water from the at least one supply location to a turbine; converting kinetic energy of the water to second motive power at the turbine; and converting the second motive power to the AC electricity at an electric generator that is connected to the turbine; and supplying the AC electricity from the electric generator.

Clause 12. The method of clause 11, wherein the source location is at a source reservoir from which the motorized pump draws the water that is moved to the at least one supply location and supplied to the turbine, and the method further comprises returning the water from the turbine back to the source reservoir as the kinetic energy of the water is converted to the second motive power.

Clause 13. The method of Clause 11 or clause 12, wherein the at least one supply location includes a coupling connected to the turbine, the motorized pump moves the water to the coupling from which the water is supplied directly to the turbine, and the kinetic energy of the water is from movement of the water to the coupling and thereby the turbine.

Clause 14. The method of clause 13, wherein the at least one supply location further includes a supply reservoir located at a higher elevation than the turbine, and supplying the water includes supplying the water from either or both the coupling or the supply reservoir.

Clause 15. The method of clause 13 or clause 14, wherein the DC electricity is converted to the first motive power at the motorized pump to move the water to the coupling from which the water is supplied to the turbine, and move the water to an external supply reservoir for an external water supply system that supplies the water independent of supplying the AC electricity.

Clause 16. The method of any of clauses 11 to 15, wherein the at least one supply location includes a supply reservoir located at a higher elevation than the turbine, and gravitational potential energy of the water at the supply reservoir is converted to the kinetic energy of the water from movement of the water as the water is supplied to the turbine.

Clause 17. The method of any of clauses 11 to 16, wherein converting the kinetic energy includes the turbine producing the second motive power from the kinetic energy of the water, and from inertia in the turbine.

Clause 18. The method of any of clauses 11 to 17, wherein the AC electricity is supplied to an electric transmission and distribution system that includes a power grid through which the AC electricity is delivered to one or more load facilities.

Clause 19. The method of any of clauses 11 to 18, wherein the AC electricity is supplied from the electric generator to a load facility independent of an electric transmission and distribution system that includes a power grid through which AC electricity is delivered.

Clause 20. The method of any of clauses 11 to 19, wherein the DC electricity is converted to the first motive power at the motorized pump to move the water to the at least one supply location, and move the water to an external supply location for an external water supply system that supplies the water independent of supplying the AC electricity.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
    a direct current (DC) source for supplying DC electricity; and
    a system for converting the DC electricity into alternating current (AC) electricity that lacks harmonic distortion, the system comprising a plurality of supply locations and a turbine, the plurality of supply locations for supplying water to the turbine for generation of the AC electricity, and the plurality of supply locations including a first supply location comprising a supply reservoir and a second supply location comprising a coupling;
    wherein the system is configurable to supply the water to the turbine on a continuum from: (1) entirely the supply reservoir, (2) a combination of the supply reservoir and from the coupling without passing through the supply reservoir, and (3) entirely the coupling without passing through the supply reservoir, and
    wherein the system comprises terminals for connection to an electric transmission and distribution system that includes a power grid through which the AC electricity is delivered to one or more load facilities.

2. The apparatus of claim 1 wherein the DC source comprises a battery.

3. The apparatus of claim 1 wherein the DC source comprises a photovoltaic system.

4. The apparatus of claim 1 wherein the system further comprises:
    a motorized pump configured to receive the DC electricity, and convert the DC electricity to a first motive power to move water from a source location to at least one of the plurality of supply locations;
    the turbine configured to convert kinetic energy of the water supplied from the at least one of the plurality of supply locations to a second motive power;
    a water supply network configured to carry the water as the water is moved from the source location to the at least one of the plurality of supply locations, and supplied from the at least one of the plurality of supply locations to the turbine; and
    an electric generator connected to the turbine, the electric generator configured to convert the second motive power to the AC electricity, and supply the AC electricity.

5. The apparatus of claim 4, wherein the source location is at a source reservoir from which the motorized pump is configured to draw the water that is moved to the at least one of the plurality of supply locations and supplied to the turbine by the water supply network, and
    wherein the turbine is further configured to return the water from the turbine back to the source reservoir as the kinetic energy of the water is converted to the second motive power.

6. The apparatus of claim 4, wherein the coupling is connected to the turbine, the motorized pump is configured to move the water to the coupling from which the water is supplied directly to the turbine, and the kinetic energy of the water is from movement of the water to the coupling and thereby the turbine.

7. The apparatus of claim 6, wherein the supply reservoir is located at a higher elevation than the turbine.

8. The apparatus of claim 7, wherein a gravitational potential energy of the water at the supply reservoir is converted to the kinetic energy of the water from movement of the water as the water is supplied to the turbine.

9. The apparatus of claim 6, wherein the motorized pump is configured to convert the DC electricity to the first motive power to move the water to the coupling from which the water is supplied to the turbine, and move the water to an external supply reservoir for an external water supply system configured to supply the water without using the AC electricity supplied by the electric generator.

10. The apparatus of claim 4, wherein the turbine configured to convert the kinetic energy includes the turbine configured to produce the second motive power from the kinetic energy of the water, and from inertia in the turbine.

11. The apparatus of claim 4, wherein the electric generator is configured to supply the AC electricity to the electric transmission and distribution system that includes the power grid through which the AC electricity is delivered to the one or more load facilities.

12. The apparatus of claim 4, wherein the electric generator is configured to supply the AC electricity to load facility independent of the electric transmission and distribution system that includes the power grid through which AC electricity is delivered.

13. The apparatus of claim 4, wherein the motorized pump is configured to convert the DC electricity to the first motive power at the motorized pump to move the water to the at least one of the plurality of supply locations, and move the water to an external supply location for an external water supply system configured to supply the water without using the AC electricity supplied by the electric generator.

14. A method comprising:
receiving direct current (DC) electricity from a source;
converting the DC electricity into alternating current (AC) electricity that lacks harmonic distortion, wherein conversion of the DC electricity into the AC electricity includes supplying water to a turbine for generation of the AC electricity and the water is suppliable to the turbine on a continuum from: (1) entirely a supply reservoir, (2) a combination of the supply reservoir and from a coupling without passing through the supply reservoir, and (3) entirely the coupling without passing through the supply reservoir; and
transmitting the AC electricity to one or more load facilities through a transmission and distribution system that includes a power grid.

15. The method of claim 14 wherein the converting the DC electricity comprises:
converting the DC electricity to a first motive power at a motorized pump to move the water from a source location to at least one of a plurality of supply locations, wherein the plurality of supply locations include a first supply location comprising the supply reservoir and a second supply location comprising the coupling;
supplying the water from the at least one of the plurality of supply locations to the turbine;
converting kinetic energy of the water to a second motive power at the turbine; and
converting the second motive power to the AC electricity at an electric generator that is connected to the turbine.

16. The method of claim 15, wherein the source location is at a source reservoir from which the motorized pump draws the water that is moved to the at least one of the plurality of supply locations and supplied to the turbine, and the method further comprises returning the water from the turbine back to the source reservoir as the kinetic energy of the water is converted to the second motive power.

17. The method of claim 15, wherein the coupling is connected to the turbine, the motorized pump moves the water to the coupling from which the water is supplied directly to the turbine, and the kinetic energy of the water is from movement of the water to the coupling and thereby the turbine.

18. The method of claim 17, wherein the supply reservoir is located at a higher elevation than the turbine.

19. The method of claim 18, wherein the DC electricity is converted to the first motive power at the motorized pump to move the water to the coupling from which the water is supplied to the turbine, and move the water to an external supply reservoir for an external water supply system that supplies the water without using the AC electricity.

20. The method of claim 15, wherein a gravitational potential energy of the water at the supply reservoir is converted to the kinetic energy of the water from movement of the water as the water is supplied to the turbine.

* * * * *

UNITED STATES PATENT AND TRADEMARK OFFICE
CERTIFICATE OF CORRECTION

| | | |
|---|---|---|
| PATENT NO. | : 12,074,504 B2 | Page 1 of 1 |
| APPLICATION NO. | : 18/063416 | |
| DATED | : August 27, 2024 | |
| INVENTOR(S) | : Michael Sean Day | |

It is certified that error appears in the above-identified patent and that said Letters Patent is hereby corrected as shown below:

On the Title Page

Item (73) should read: TRANE INTERNATIONAL INC., Davidson, NC (US)

Signed and Sealed this
Eighth Day of October, 2024

Katherine Kelly Vidal
*Director of the United States Patent and Trademark Office*